(12) United States Patent
Peev et al.

(10) Patent No.: US 7,017,155 B2
(45) Date of Patent: Mar. 21, 2006

(54) INSTALLING SOFTWARE ON A MOBILE COMPUTING DEVICE USING THE ROLLBACK AND SECURITY FEATURES OF A CONFIGURATION MANAGER

(75) Inventors: Igor B. Peev, Seattle, WA (US); Scott R. Shell, Redmond, WA (US); Kevin J. Savage, Sammamish, WA (US); Hung M. Dang, Seattle, WA (US); Nicholas M. Hofmeister, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 12 days.

(21) Appl. No.: 11/047,208

(22) Filed: Jan. 31, 2005

(65) Prior Publication Data
US 2005/0132358 A1 Jun. 16, 2005

Related U.S. Application Data

(62) Division of application No. 10/005,959, filed on Dec. 5, 2001.

(51) Int. Cl.
*G06F 9/445* (2006.01)
*G06F 9/45* (2006.01)
(52) U.S. Cl. .................. 717/176; 717/136; 726/17; 726/27
(58) Field of Classification Search ............. 717/176; 726/17
See application file for complete search history.

(56) References Cited

U.S. PATENT DOCUMENTS

| | | | | |
|---|---|---|---|---|
| 4,665,520 A | * | 5/1987 | Strom et al. ................ | 714/15 |
| 5,113,518 A | * | 5/1992 | Durst et al. ................ | 713/200 |
| 6,078,921 A | * | 6/2000 | Kelley ..................... | 707/10 |
| 6,141,683 A | * | 10/2000 | Kraml et al. ............... | 709/220 |
| 6,199,204 B1 | | 3/2001 | Donohue .................. | 717/11 |
| 6,298,478 B1 | * | 10/2001 | Nally et al. ................ | 717/170 |
| 6,324,693 B1 | * | 11/2001 | Brodersen et al. .......... | 717/177 |
| 6,360,364 B1 | * | 3/2002 | Chen et al. ................ | 711/169 |

(Continued)

FOREIGN PATENT DOCUMENTS

EP        0 791 881        8/1997

(Continued)

OTHER PUBLICATIONS

Cris Pedregal Martin, Krithi Ramamritham, "Recovery guarantees in mobile systems", Aug. 1999, Proceedings of the 1st ACM international workshop on Data engineering for wireless and mobile access, pp. 22-28, ISBN: 1-58113-175-5.*

(Continued)

*Primary Examiner*—Tuan Dam
*Assistant Examiner*—J. Derek Rutten
(74) *Attorney, Agent, or Firm*—Workman Nydegger

(57) ABSTRACT

Installing software using the configuration manager so that the rollback and security features of the configuration manager may be used during the installation process. A mobile computing device accesses files that are to be installed on the mobile computing device, and well as computer-executable instructions that define how the files are to be installed on the mobile computing device. The configuration manager then causes the computer-executable instructions to be executed (e.g., using configuration service providers), and causes a mirroring rollback document to be constructed. If the installation fails, the installation process is reversed by executing the rollback document. The configuration manager may also be used to implement security when executing the installation instructions by checking to determine whether or not execution of each installation instruction is authorized.

22 Claims, 5 Drawing Sheets

U.S. PATENT DOCUMENTS

| | | | |
|---|---|---|---|
| 6,363,499 B1 * | 3/2002 | Delo et al. | 714/15 |
| 6,366,898 B1 * | 4/2002 | Taivalsaari et al. | 707/1 |
| 6,434,628 B1 * | 8/2002 | Bowman-Amuah | 714/48 |
| 6,434,744 B1 * | 8/2002 | Chamberlain et al. | 717/168 |
| 6,438,749 B1 * | 8/2002 | Chamberlain | 717/174 |
| 6,493,751 B1 * | 12/2002 | Tate et al. | 709/221 |
| 6,523,166 B1 * | 2/2003 | Mishra et al. | 717/174 |
| 6,687,873 B1 * | 2/2004 | Ballantyne et al. | 715/500 |
| 6,698,018 B1 * | 2/2004 | Zimniewicz et al. | 717/175 |
| 2002/0098840 A1 * | 7/2002 | Hanson et al. | 455/435 |
| 2002/0100036 A1 * | 7/2002 | Moshir et al. | 717/173 |
| 2002/0124245 A1 * | 9/2002 | Maddux et al. | 717/176 |
| 2002/0144151 A1 * | 10/2002 | Shell et al. | 713/201 |
| 2003/0009752 A1 * | 1/2003 | Gupta | 717/171 |
| 2003/0018764 A1 * | 1/2003 | Shell et al. | 709/223 |
| 2003/0061311 A1 * | 3/2003 | Lo | 709/220 |
| 2003/0108039 A1 * | 6/2003 | Shell et al. | 370/389 |
| 2004/0003266 A1 * | 1/2004 | Moshir et al. | 713/191 |
| 2004/0116140 A1 * | 6/2004 | Babbar et al. | 455/517 |

FOREIGN PATENT DOCUMENTS

| | | |
|---|---|---|
| EP | 0 811 942 | 12/1997 |
| EP | 1 043 906 | 10/2000 |

OTHER PUBLICATIONS

Nuno Neves, W. Kent Fuchs, "Adaptive recovery for mobile environments", Jan. 1997, Communications of the ACM, vol. 40 Issue 1, pp. 68-74, ISSN: 0001-0782.*

V. K. Murthy, "Transactional workflow paradigm: its application to mobile computing", Feb. 1998, Proceedings of the 1998 ACM symposium on Applied Computing, pp. 424-432, ISBN: 0-89791-969-6.*

Jin Jing, Abdelsalam Sumi Helal, Ahmed Elmagarmid, "Client-server computing in mobile environments", Jun. 1999, ACM Computing Surveys (CSUR), vol. 31 Issue 2, pp. 117-157, ISSN: 0360-0300.*

Jiannong Cao; Chan, G.H.; Weijia jia; Dillon, T.S., "Checkpointing and rollback of wide-area distributed applications using mobile agents", Apr. 2001, Parallel and Distributed Processing Symposium., Proceedings 15th International.*

Steve Tate et al., "Windows 2000 Essential Reference", Apr. 2000, New Riders Publishing, ISBN: 0-7357-0869-X, Chapter 7.3.*

Mike Kelly, "Gain Control of Application Setup and Maintenance with the New Windows Installer", Sep. 1998, Microsoft Systems Journal, printed and accessed online on Jan. 5, 2005 at <http://www.microsoft.com/msj/0998/windowsInstaller.aspx>.*

E. H. Baalbergen, K. Verstoep, A. S. Tanenbaum, "On the design of the amoeba configuration manager", Oct. 1989, ACM SIGSOFT Software Engineering Notes, vol. 14 Issue 7, pp. 15-22.*

Hall, et al., "Evaluating Software Deployment Languages and Schema: An Experience Report," Proceedings. International Conference on Software Maintenance (CAT. No. 98CB36272), Proceedings. International Conference on Software Maintenance, Bethesda, MD, Nov. 16-20, 1998, pp. 177-185.

"Designs for Uncomitting an Instal Plan Object," IBM Technical Disclosure Bulletin, IBM Corporation, New York, US, vol. 38, No. 7, Jul. 1, 1995, pp. 227-229.

* cited by examiner

INSTALLING SOFTWARE ON A MOBILE COMPUTING DEVICE USING THE ROLLBACK AND SECURITY FEATURES OF A CONFIGURATION MANAGER

CROSS-REFERENCE TO RELATED APPLICATIONS

The present application is a divisional of U.S. patent application Ser. No. 10/005,959 filed Dec. 5, 2001, entitled "Installing Software on a Mobile Computing Device Using the Rollback and Security Features of a Configuration Manager", which is incorporated herein by reference.

BACKGROUND OF THE INVENTION

1. The Field of the Invention

The present invention relates to the field of software installation technology. Specifically, the present invention relates to methods, systems, computer program products and data structures for installing software on a mobile computing device using the rollback and security features of a configuration manager.

2. Background and Related Art

Computers have revolutionized our way of life. The functional components of a general-purpose computing device may be divided into two general categories; namely, hardware and software. The hardware includes, for example, one or more processors, various types of memory (e.g., RAM, ROM, FLASH, hard drive, CD-ROM and the like), user interfaces (e.g., a monitor, keyboard, mouse, speakers, printer, scanner and the like), and networking devices (e.g., modem, network interface card, antenna and the like). Software contains instructions that, when executed by a processor, controls the various operations of the hardware so that the hardware interacts in a manner that accomplishes certain tasks. Typical computing devices contain a variety of software that facilitates a wide array of functionality.

Often, is desirable to add additional software to a computing device in order to further improve the operational capability of the computing device. In order to install the software, the computing device gains access to an installation file. The installation file typically contains a number of compressed files that ultimately need to extracted and stored in a suitable directory location on the computing device. The installation file also includes a series of instructions that are followed in order to properly install the extracted files. For example, such instructions may direct the computing device to extract a file, move a file, copy a file, delete a file, or set configuration information.

A typical installation process is essentially initiated by the user of the computing device. For example, the user may purchase software on computer-readable media such as a hard disk, CDROM or the like, or perhaps the user may download the software over a network. In mobile computing devices, however, a relatively new form of installation is taking hold. In particular, the mobile computing device receives a notification that new software is available, and then the user is typically given an option to accept the new software. If accepted, the software may potentially be downloaded to the mobile computing device where it is installed.

Operating systems for conventional general-purpose computers typically provide some level of security in ensuring that processes and individuals are appropriately limited in the types of operations they may perform on certain files and in certain directories. However, operating systems for mobile devices may have reduced functionality due to the relatively limited memory and processing capabilities of mobile computing devices as compared to laptop or desktop computers.

Often, such operating systems may be relatively limited in the types of security control due to such processing and memory limitations. Nevertheless, the trustworthiness of software providers may be more in question when downloading an installation file in response to an asynchronous notification to a mobile computing device. Accordingly, what is desired are systems, methods, computer program products, and data structures for providing security when installing software in an environment in which processing and memory capacities are limited.

In addition, installation processes may fail for one reason or another. For example, perhaps the computing system crashes, or perhaps the installation software attempts to manipulate files, directories, or configuration settings that the installation software is not entitled to manipulate. If the software installation fails, the operating system may store erroneous configuration settings that presuppose that the software installation will be successful. In addition, files that were part of the installation may be stored on the computing device, even though those files are useless since the installation was interrupted. The erroneous configuration settings affect the proper operation of the computing device. In addition, the useless files occupy valuable memory space, which is especially detrimental in limited memory environments such as on mobile computing devices. Accordingly, what is further desired are systems, methods, computer program products and data structures for reversing the effects of an installation should the installation fail in a mobile computing environment.

SUMMARY OF THE INVENTION

Methods, systems, computer program products and data structures are described that allow a mobile computing device to install software using the configuration manager so that the rollback and security features of the configuration manager may be used during the installation process. The rollback features allow the effects of the installation to be entirely reversed should the installation be unsuccessful for any reason or otherwise desired to be reversed. The security features allow for appropriate access control over what operations may be performed on which directories and files during the operation.

In one example, these rollback and security features are already being performed in the context of setting configuration information using the configuration manager. By applying this functionality to the installation not only in the context of configuration settings, but also in the context of directory and file operations, the memory and processing overhead in applying the rollback and security functionality to the installation process is minimized. This is especially important in the context of mobile computing devices such as cellular telephones and Personal Digital Assistants (PDAs), which typically have relatively limited processing and memory capabilities as compared to laptop or desktop computers.

The invention may be implemented in a network environment in which there resides an installation file that may be used to install software such as a new application or a patch. The network also includes a mobile computing device. For example, the network environment could include a server downloading an installation file to a cellular telephone over a cellular telephone network. The network could also include a desktop personal computer transferring the installation file to a PDA via a docking cradle.

In accordance with the present invention, the mobile computing device accesses at least a version of one or more files that are to be installed on the mobile computing device as part of the installation. For example, these files may be in compressed form to ensure efficient use of network bandwidth, or they may be uncompressed.

The mobile computing device also accesses computer-executable instructions that define how the files are to be installed on the mobile computing device. Such instructions may include, for example, directives to copy, move, or delete files, as well as directives to set configuration information. The files that are to be installed as well as the instructions to install may be included as part of a single installation file.

The computer-executable instructions are directly interpretable by a configuration manager associated with the mobile computing device. For example, the computer-executable instructions may be structured in accordance with a particular schema using, for example, a language defined by the eXtensible Markup Language (XML) specification. This particular schema may be a set of rules in which the meaning of values within the structure is derived by the context of the value within the structure.

The configuration manager then causes the computer-executable instructions to be executed. For example, the configuration manager may directly execute the instructions, or perhaps causes another component (such as configuration service providers) to execute certain instructions. For example, the configuration manager may cause the file operation instructions to be executed by a file configuration service provider, while causing the configuration operation instructions to be executed by a registry service provider.

During execution of these instructions, the configuration manager may implement rollback and security functionality. The rollback features allow for the effects of the installation to be reversed if, for some reason, the installation fails or is no longer desired.

Thus, if the installation fails, the mobile computing device is returned to its original state. There are no unwanted configuration setting changes that presuppose a successful installation. Accordingly, the processing of the mobile computing device is not hampered by erroneous configuration settings. In addition, there are no useless straggling files that were installed with an eye towards a successful installation. Accordingly, the memory of the mobile computing device is spared from having to store useless information as a result of the failed installation. This is particularly advantageous in the context of mobile computing devices in which processing and memory capabilities are relatively limited.

The configuration manager may also be used to implement security when executing the installation instructions by checking to determine whether or not execution of each installation instruction is authorized. In this manner, the mobile computing device may protect itself from a rogue or negligent provider of new software from performing installation operations that are harmful to the mobile computing device as a whole.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE INVENTION

Figure 1:
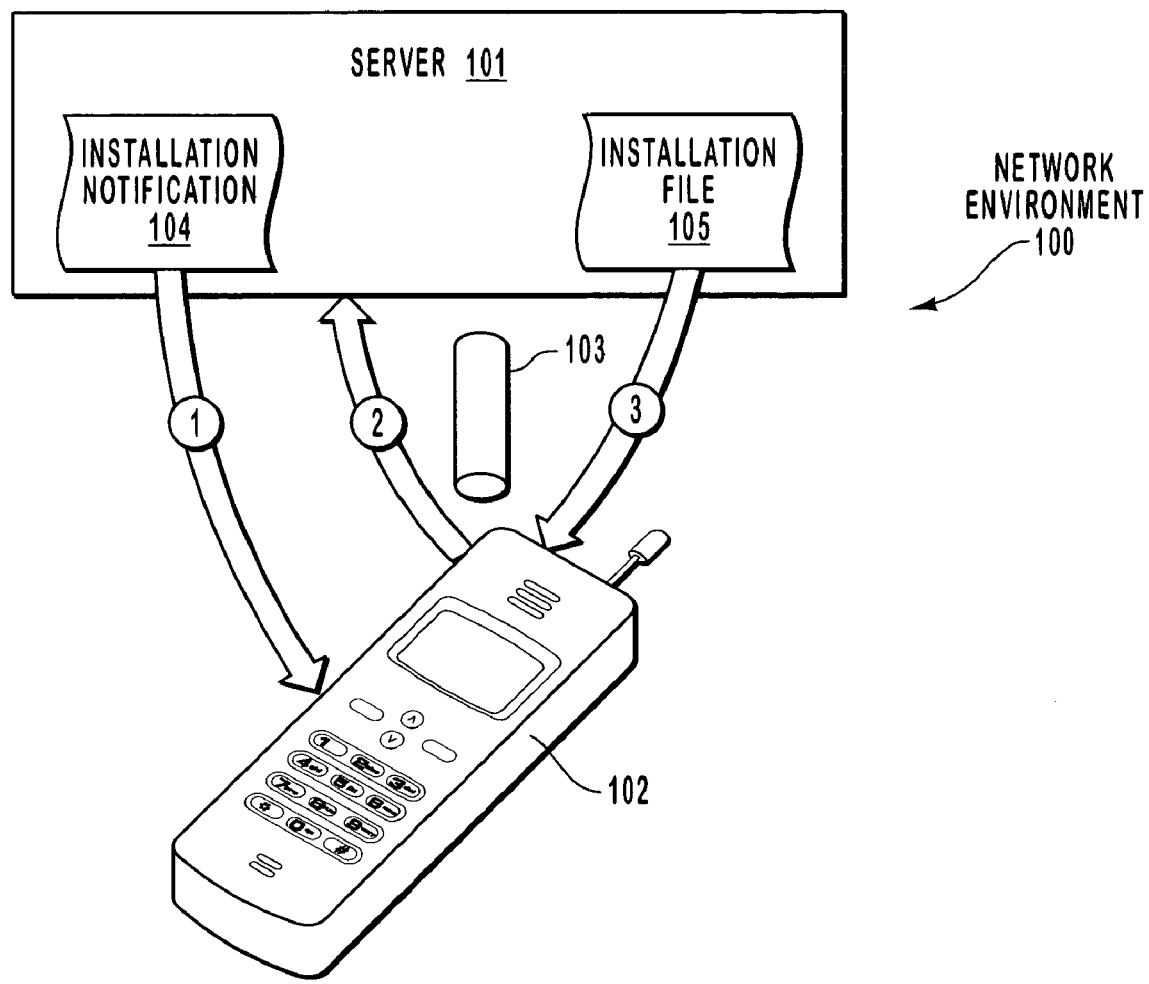
FIG. 1 illustrates an example network environment that may be used to deliver an installation file to a mobile computing device.

The present invention extends to methods, systems, computer program products and data structures for installing software using the configuration manager so that the rollback and security features of the configuration manager may be used during the installation process. The rollback features allow the effects of the installation to be entirely reversed should the installation be unsuccessful for any reason or otherwise desired to be reversed. The security features allow for appropriate access control over what operations may be performed on which directories and files during the installation.

A mobile computing device accesses an installation file. The installation file contains one or more files that are to be installed on the mobile computing device (also called herein "files to be installed"), as well as computer-executable instructions for installing the files (also called herein "installation instructions"). An installer passes the installation instructions to a configuration manager and extracts the files to be installed. The installation instructions are in a format that may be directly interpreted by the configuration manager. The configuration manager then causes the installation instructions to be executed by, for example, parsing the installation instructions and passing the instructions to appropriate configuration service providers.

In order to implement rollback features, the configuration manager constructs a rollback document. If the installation is ultimately successful, then the installation is committed as a single transaction. On the other hand, if the installation fails, the installation process is reversed by executing the rollback document. In one embodiment, state information concerning the transaction is maintained in persistent memory. Thus, if the mobile computing device loses power, the transaction state is still available for resuming the transaction when power is restored. Accordingly, the transaction may survive power interruptions.

The configuration manager may also be used to implement security when executing the installation instructions by checking to determine whether or not execution of each installation instruction is authorized. In particular, as an installation file is received, the installation file is assigned a role mask that depends on credentials provided with the installation file. The role mask is used to define what installation operations may be performed on what files and settings on the mobile computing device. If the installation instructions represent any unauthorized operations, the configuration manager ensures that the installation is not performed, and that the mobile computer device remains in its pre-installation state. By so doing, the mobile computing device may protect itself from the provider of the new software performing installation operations that are harmful to the mobile computing device.

The embodiments of the present invention may comprise a special purpose or general purpose computing device including various computer hardware, as discussed in greater detail below. Embodiments within the scope of the present invention also include computer-readable media for carrying or having computer-executable instructions or data structures stored thereon. Such computer-readable media can be any available media which can be accessed by a general purpose or special purpose computer. By way of example, and not limitation, such computer-readable media can comprise physical storage media such as RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer.

When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media. Computer-executable instructions comprise, for example, instructions and data which cause a general purpose computer, special purpose computer, or special purpose processing device to perform a certain function or group of functions.

Although not required, the invention will be described in the general context of computer-executable instructions, such as program modules, being executed by computing devices. Generally, program modules include routines, programs, objects, components, data structures, and the like that perform particular tasks or implement particular abstract data types. Computer-executable instructions, associated data structures, and program modules represent examples of the program code means for executing steps of the methods disclosed herein. The particular sequence of such executable instructions or associated data structures represent examples of corresponding acts for implementing the functions described in such steps.

Those skilled in the art will appreciate that the invention may be practiced in network computing environments with many types of computer system configurations, including personal computers, hand-held devices, multi-processor systems, microprocessor-based or programmable consumer electronics, network PCs, minicomputers, mainframe computers, and the like. The invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

FIG. 1 illustrates a network environment 100 in which an installation file may be delivered to a mobile computing device. Principally, the network environment 100 includes a server 101 in communication with a mobile computing device 102 over a wireless link 103.

The server 101 may be the principal point of connectivity for the mobile computing device 102, such as a public wireless service provider (e.g., a cellular carrier) or a private wireless communications network (e.g., a corporate communications network). Alternatively, the server 101 may be a dedicated server acting in cooperation with the principal point of connectivity.

The mobile computing device 102 is illustrated and described in detail further below with respect to FIGS. 2 and 3. Briefly stated, the mobile computing device 102 is a handheld computing device that includes the functionality of a mobile telephone as well as the functionality of a typical Personal Digital Assistant (PDA).

The server 101 and the mobile computing device 102 communicate with each other over a wireless link 103, which may be any means for wireless communications, such as a radio frequency link or the like. For example, the server 101 may detect that new software (e.g., a new application, update, or patch) is available for installation on the mobile computing device 102. The server 101 may then dispatch an installation notification 104 to the mobile computing device 102 over the wireless link 103 notifying the mobile computing device 102 of the newly available software. This notification is represented by the first arrow in FIG. 1. This notification may be facilitated over a wireless telephone network using a Wireless Application Protocol (WAP) push notification, a HyperText Transport Protocol (HTTP) push notification, or any other possible notification method, whether currently existing or to be developed.

There are a wide variety of such notification methods. For example, the user might use a browser of the mobile computing device 102 to navigate a corporate network or the Internet to find a download site. The user consent to installation by selecting a link corresponding to the installation file. The browser then submits a request (e.g., an HTTP Get command) for the installation file, which will then be automatically downloaded.

Alternatively, the mobile computing device 102 may be docked in a cradle coupled to a desktop computer or laptop computer via a Universal Serial Bus ("USB") or serial cable. The desktop computer may use synchronization software (e.g., ActiveSync) to download the installation file to the mobile computing device. The user consents to the installation by causing the installation file to be downloaded to the mobile computing device 102.

In another example, the installation file is contained as an attachment or as a link within an e-mail or a short text message sent to the mobile computing device 102. The user would consent to the installation by selecting the attachment or the link.

The carrier may also send Service Indication (SI) and Service Loading (SL) messages through a Push Proxy Gateway (PPG) to the mobile computing device 102. The mobile computing device 102 may be configured to place these special-purpose Short text Message Service (SMS) message in an in-box. In the case of an SI message, the user consents to installation by selecting a link in the message. In the case of an SL message, the device itself attempts to download the installation file.

The installation file may also be stored on a MultiMediaCard (MMC) memory card. The MMC can even automatically start an installation script if the MMC card includes an Autorun file and Autorun has been enabled on the mobile computing device 102. In this case, the user consents to installation by plugging in the MMC device.

If the mobile computing device 102 consents to the installation, the mobile computing device 102 submits a request for an installation file associated with the new software. This may take the form of an HTTP Get request and is represented by the second arrow in FIG. 1. The installation file 105 is then downloaded to the mobile computing device 102. For example, the installation file 105 may be downloaded in a same-session response to the HTTP Get request. The downloading of the installation file 105 is represented by the third arrow in FIG. 1. The mobile computing device 102 then installs the new software using the installation file 105 as described further below with respect to FIGS. 3 through 6.

Although described here principally in the context of an installation file 105 being delivered to a mobile computing device 102 over a wireless link 103, it will be appreciated that this is just one implementation for downloading the installation file 105. Above are described several methods for delivering the installation file 105 to the mobile computing device 102, some being network-oriented, and some not. Thus, the second and third arrows in FIG. 1 may represent any form of communication in which a user consents to installation, and the installation file is executed on the mobile computing device 102.

Figure 2:
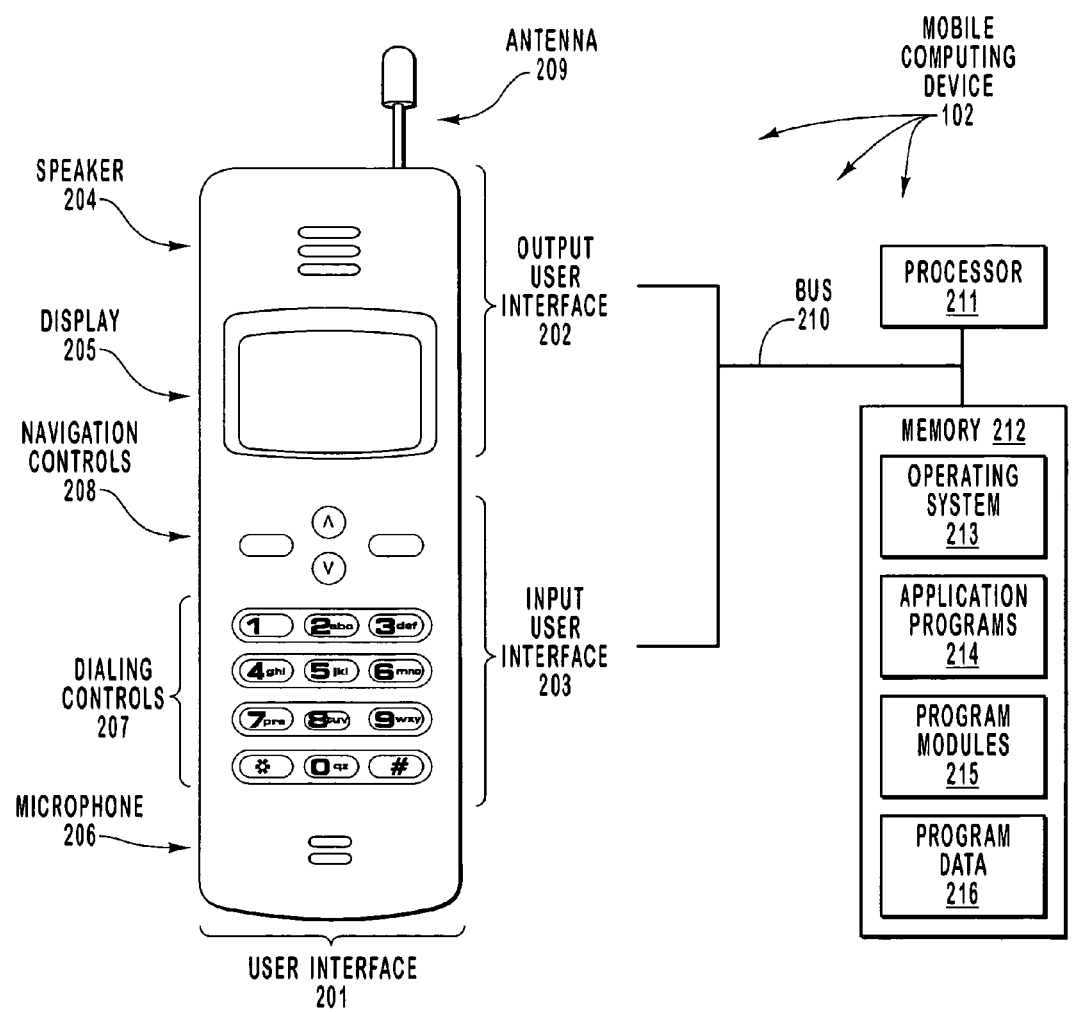
FIG. 2 illustrates operational components of a mobile computing device onto which new software may be installed in accordance with the principles of the present invention.

FIG. 2 illustrates the mobile computing device 102 in further detail. The mobile computing device 102 includes a user interface 201 for allowing a user to input information through an input user interface 203, and review information presented via an output user interface 202. For example, the output user interface 202 includes a speaker 204 for presenting audio information to the user, as well as a display 205 for presenting visual information to the user. The mobile computing device 102 also has an antenna 209 for wireless communication with the server 101 over the wireless link 103.

The input user interface 203 may include a microphone 206 for rendering audio information into electronic form. In addition, the input user interface 203 includes dialing controls 207 represented by 12 buttons through which a user may dial a telephone number, enter a text message, or instruct the mobile computing device 102 to send a data message. Input user interface 203 also includes navigation control buttons 208 that assist the user in navigating through various entries and options that may be listed on display 205.

Although the mobile computing device 102 has the appearance of a mobile telephone, the unseen features of the mobile computing device 102 may allow for complex and flexible general-purpose processing capabilities. For example, the mobile computing device also includes a processor 211 and a memory 212 that are connected to each other and to the user interface 201 via a bus 210. Historically, the processing and memory capacity of mobile computing devices such as cellular telephones and PDAs are relatively limited as compared to laptop and desktop personal computers. The memory 212 generically represents a wide variety of volatile and/or non-volatile memories that may be employed. The particular type of memory used in the mobile computing device 102 is not important to the present invention.

Program code means comprising one or more program modules may be stored in memory 212. The one of more program modules may include an operating system 213, one or more application programs 214, other program modules 215, and program data 216. The environment illustrated in FIG. 2 is illustrative only, and by no means represents even a small portion of the wide variety of mobile computing devices in which the principles of the present invention may be implemented.

Figure 3:
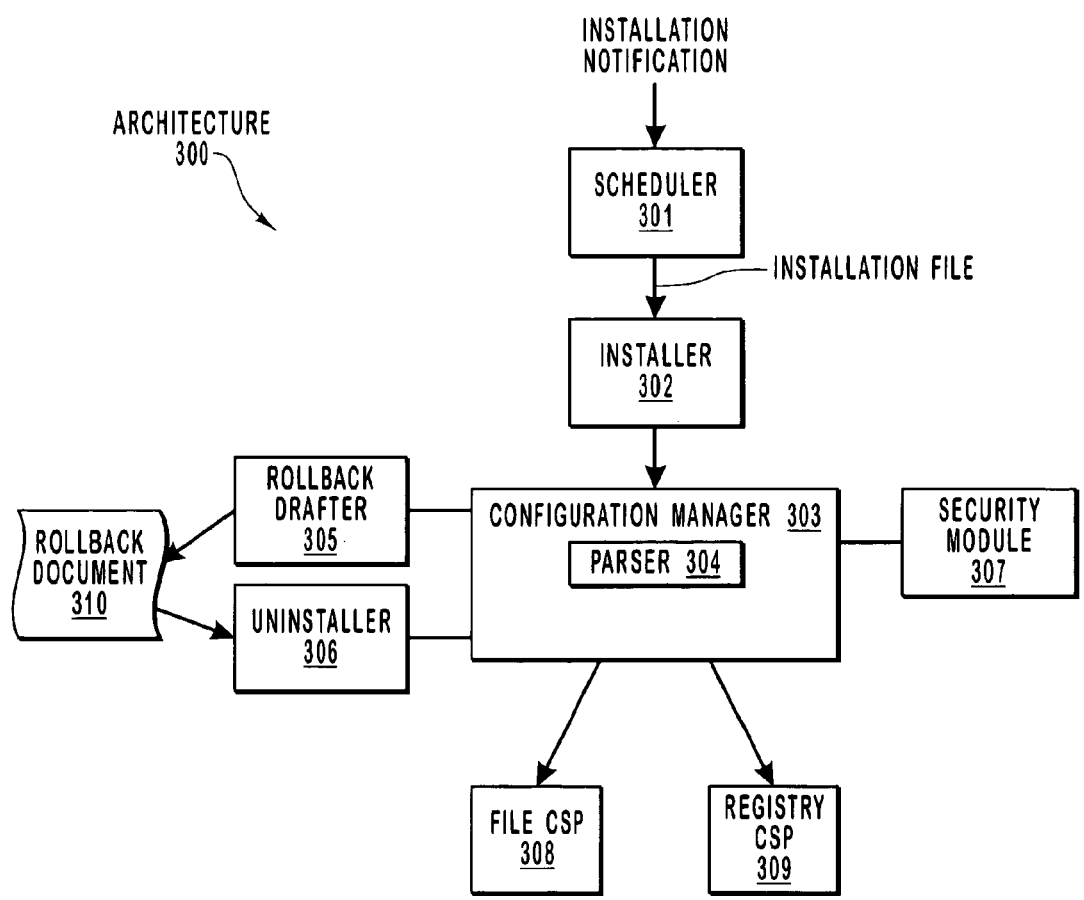
FIG. 3 illustrates an architecture of various components that may be used to install new software on the mobile computing device.

FIG. 3 schematically illustrates an architecture 300 that may be implemented by the mobile computing device 102. In particular, the components illustrated in FIG. 2 include several functional components such as a scheduler 301, installer 302, configuration manager 303, parser 304, a rollback drafter 305, an uninstaller 306, a security module 307, a file Configuration Service Provider (CSP) 308 and a registry CSP 309. These functional components may be, for example, one of application programs 214, program modules 215, or portions of the operating system 213 of the mobile computing device 102. The rollback document 310 may be, for example, part of program data 216 of the mobile computing device 102.

If the delivery of the installation file 105 is to occur over a network the scheduler 301 receives the installation notification 104 and optionally retrieves the installation file 105 from the server 101. The scheduler 301 then triggers the installer 302 to install the new software using the installation file 105. The architecture 300 of FIG. 3 then may employ the method of FIG. 4 to install the new software using the rollback and security features of a configuration manager. Accordingly, the remainder of the architecture of FIG. 3 (essentially, all the components except the scheduler 301) will be described with frequent reference to FIG. 4.

Figure 4:
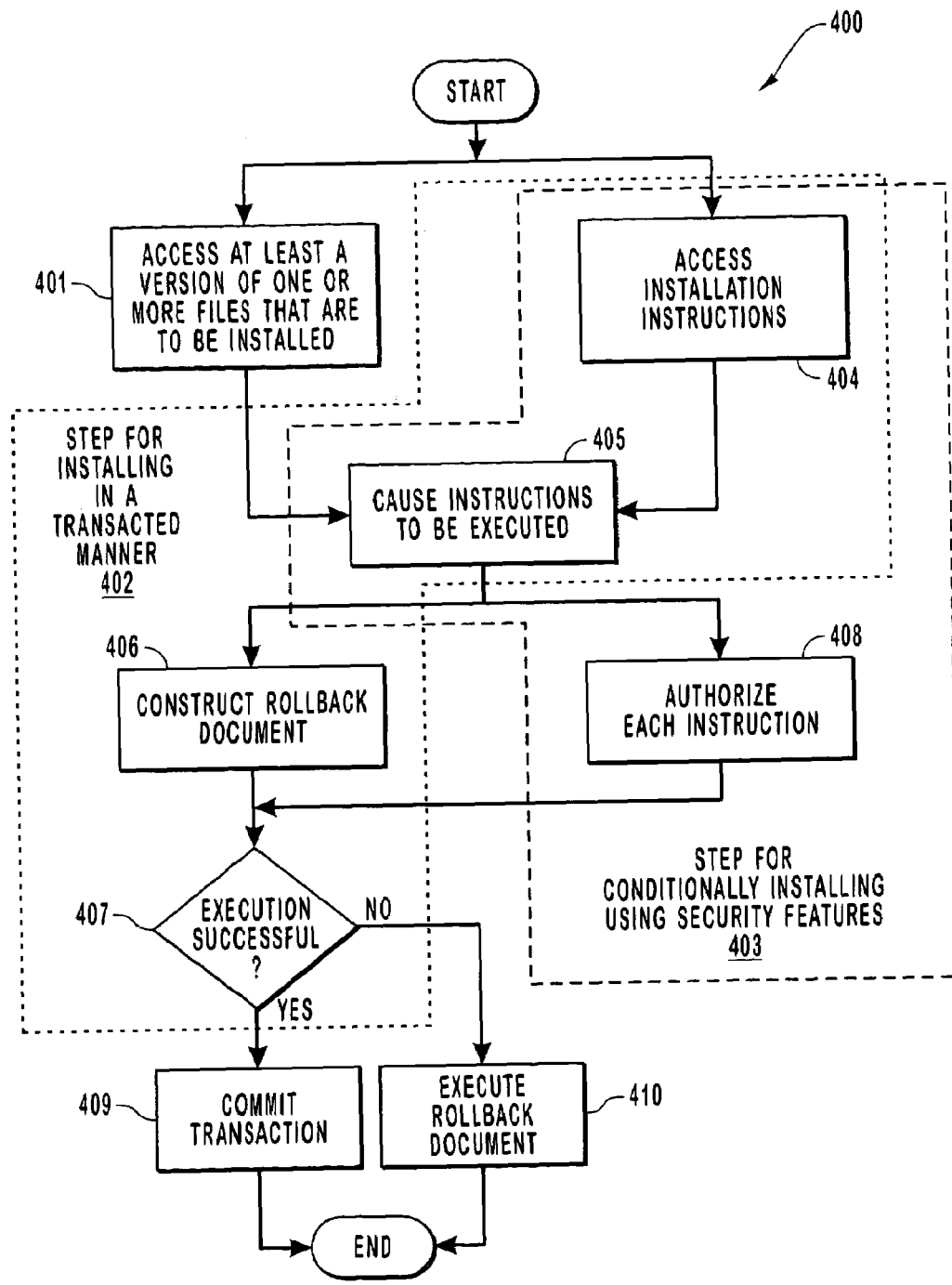
FIG. 4 illustrates a flowchart of a method for installing new software on the mobile computing device using the rollback and security features of the configuration manager.

Referring to the method 400 of FIG. 4, the mobile computing device 102 accesses at least a version of one or more files that are to be installed on the mobile computing device as part of the installation of the new software (act 401). For example, these files may be in compressed form to ensure efficient use of network bandwidth, in which case the mobile computing device accesses a compressed version of the files. However, an installation file may also include the files themselves, without any compression.

The mobile computing device 102 also accesses computer-executable instructions that define how the files are to be installed on the mobile computing device (act 402). Such instructions may include, for example, directives to copy, move, or delete files, as well as directives to set configuration information.

Figure 5:
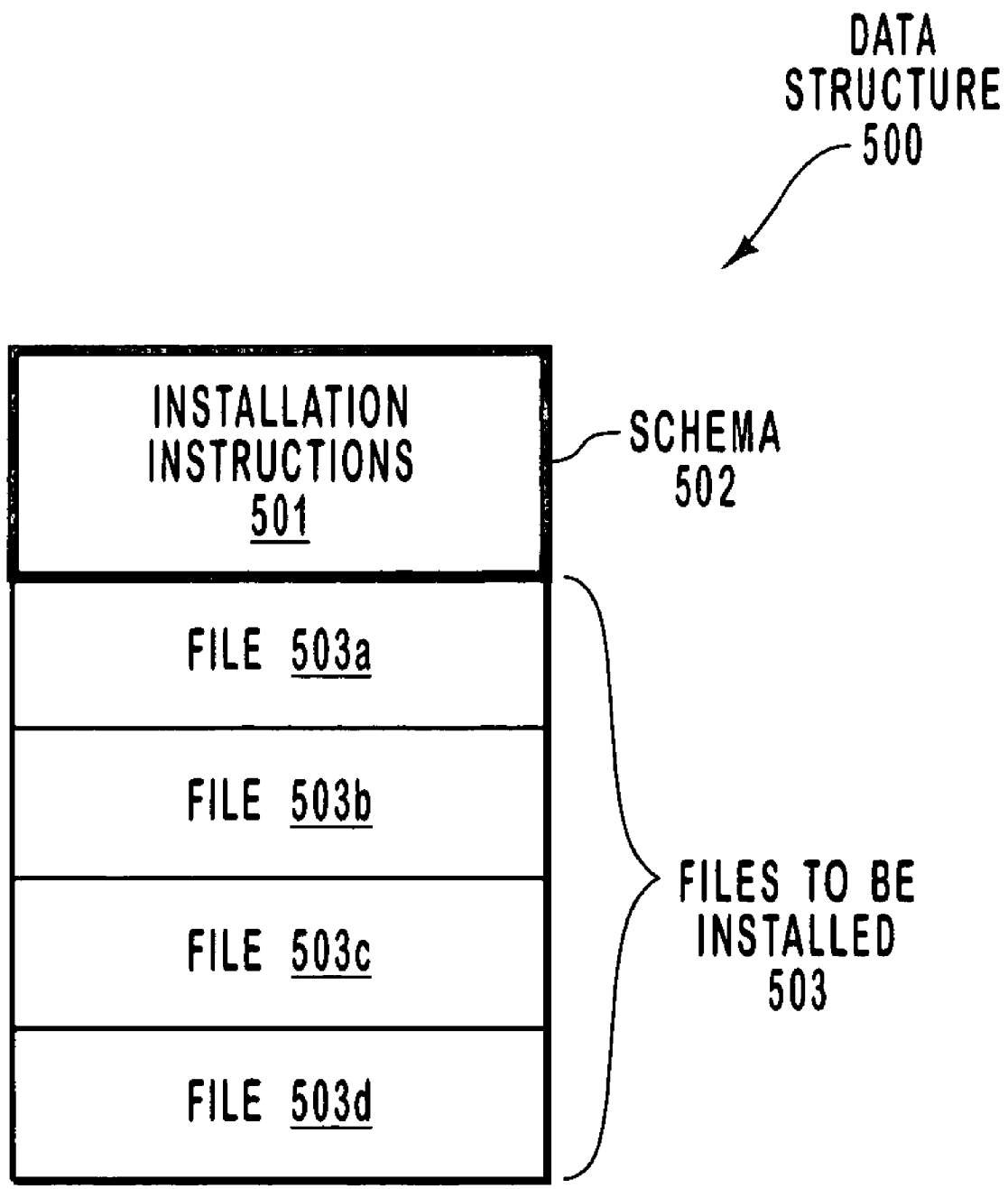
FIG. 5 illustrates a data structure of an installation file that includes files to be installed, as well as an instruction section that directs the installation.

The files that are to be installed as well as the installation instructions may be included as part of the installation file 105. In that case, the act of accessing the files that are to be installed (act 401), and the act of accessing the installation instructions (act 404) may be performed by the installer 302 simply accessing a single installation file such as the installation file 105. FIG. 5 schematically illustrates a data structure 500 of the installation file 105. The data structure 500 includes a number of files 503 that are to be installed such as files 503a through 503d. The data structure 500 also includes installation instructions 501 for dictating how to install the files 503 on the mobile computing device 102.

The installation instructions 501 are directly interpretable by the configuration manager 303. For example, the installation instructions 501 may be structured in accordance with a particular schema. The fact that the installation instructions 501 follow this schema is represented by the installation instructions 501 being highlighted by a thicker line labeled schema 502 in FIG. 5. An example of the installation instructions following a schema using the eXtensible Markup Language (XML) specification is described further below. In this description and in the claims, a "schema" is defined as a set of rules by which a data structure may be organized in which the meaning of values within the structure are derived by the context of the value within the structure.

In conventional approaches, installation instructions are executed directly by a specialized installer. However, in accordance with the present invention, the installer 302 only assists the installation process. In particular, the installer 302 extracts the files 503 to be installed (assuming they were in compressed form), and then stores them in memory 212. The installer 302 also passes the installation instructions 501 to the configuration manager. In some embodiments, the configuration manager 303; may directly execute the installation instructions. However, in the embodiment described herein, the configuration manager 303 parses through the installation instructions using a parser 304 and routes the appropriate installation instructions to other appropriate components. For example, the configuration manager 303 may cause the file operation instructions (e.g., move file, copy file, or delete file) to be executed by a file configuration service provider 308, while causing the configuration operation instructions to be executed by a registry configuration service provider 309.

Previously, the configuration manager 303 merely took charge of changing and otherwise managing configuration settings using a configuration service provider. However, the principles of the present invention allocate the responsibility for overseeing overall installation operations to the configuration manager 303 as well. Thus, any functionality that the configuration manager 303 offered to the setting of configuration information may also be applied for file operations. The file operations and the configuration setting instructions are structured in accordance with a schema that the configuration manager 303 follows. Thus, the configuration manager 303 may parse both the configuration setting instructions as well as the file operation instructions with minimal change to the operation and coding of the configuration manager 303. At a minimum, the configuration manager 303 need only recognized the file operation instruction and pass the file operation instructions to a component (e.g., the file CSP 308) that is capable of performing the file operation.

In this manner, the functionality of the configuration manager 303 in the context of setting configuration information may be extended to installation processing. For example, during execution of installation instructions in act 405, the configuration manager may implement rollback and security functionality. The rollback features allow for the effects of the installation to be reversed if, for some reason, the installation fails or is no longer desired. First, the rollback features of the installation process will be described followed by a description of the security features of the installation process.

Referring to FIG. 3, the rollback features of the configuration manager 303 are supported by the rollback drafter 305, the rollback document 310, and the uninstaller 306 which are accessible, directly or indirectly, by the configuration manager 303. Details regarding how a configuration manager sets configuration information on a transacted bases using rollback features are described in commonly-owned, co-pending U.S. patent application Ser. No. 09/895,471, filed Jun. 29, 2001, and entitled "System and Method for Continuously Provisioning a Mobile Device", which is incorporated herein by reference in its entirety.

Notwithstanding that the detailed rollback operation is described in the corresponding application incorporated by reference above, the rollback operation is now briefly described herein with respect to FIG. 4. FIG. 4 illustrates a step for installing the new software in a transacted manner (step 402) using the configuration manager 303. The step includes corresponding acts 404 and 405, which have been previously described, in addition to corresponding acts 406 and 407.

In particular, the configuration manager 303 causes a rollback document 310 to be constructed (act 406). As part of the installation, the mobile computing device 102 may receive a provisioning document that may be or include the installation file 105. The provisioning document includes information about which configuration service providers will be needed to complete the installation, and thus identifies which configuration service providers need to be instantiated. The configuration manager 303 instantiates the file CSP 308 and the Registry CSP 309 based on this information (as well as any other needed CSPs).

The configuration manager 303 then identifies files and/or other data items that may be altered as a result of the installation. For example, the configuration manager 303 queries the file CSP 308 for the current state of any files that are to be altered as part of the installation, and queries the Registry CSP 309 for the current state of any configuration changes that may be altered as part of the installation. The configuration manager 303 then compiles the current state into the rollback document 310. Thus, the rollback document 310 represents the state of the mobile computing device prior to installation with respect to those items that will likely change as a result of the installation.

The configuration manager 303 then determines whether or not the installation has been or will be successful (act 407). For example, the configuration manager 303 passes the relevant instructions to the relevant CSP, and asks each CSP if this would result in a successful installation. If any of the CSPs indicate that the installation would be unsuccessful, the configuration manager 303 determines that installation would be unsuccessful (NO in decision block 407). For example, perhaps a CSP detected that one or more of the installation instructions were not entitled to be executed given the identity of the installation file. In one embodiment, this is accomplished using role masks assigned to the installation file. More regarding how the CSPs may use role masks to implement security will be described hereinafter. If it is determined that installation would be unsuccessful prior to executing the installation instructions, there would be no need to executed the rollback document in act 410. Instead, the configuration manager 303 may simply refuse to perform the installation.

If it is determined by this querying process that installation is likely to be successful (YES in decision block 407), then the configuration manager 303 commits the transaction (act 409). In particular, the configuration manager 303 instructs each of the CSPs to implement their corresponding installation instructions. If, for some reason, the installation fails despite the preliminary query, then the configuration manager 303 determines that the installation was unsuccessful (NO in decision block 407). Since installation instructions have already been executed at the time of this determination, the configuration manager 303 uses the rollback document 310 to restore the mobile computing device 102 back to its pre-installation state (act 410). This completes the step for installing the new software in a transacted manner (step 402).

Thus, if the installation fails, the mobile computing device 102 is returned to its original state. There are no unwanted configuration setting changes that presupposed a successful installation. Accordingly, the processing of the mobile computing device 102 is not hampered by erroneous configuration settings. In addition, there are no useless straggling files that were installed with an eye towards a successful installation. Accordingly, the memory of the mobile computing device 102 is spared from having to store useless information as a result of the failed installation.

The architecture 300 illustrated in FIG. 3 not only supports installation of new software on a transacted basis, but it also conditionally installs the new software using security features offered by the configuration manager 303. Specifically, the security module 307 supports these security features, the security module 307 being accessible, directly or indirectly, to the configuration manager 303. Details regarding how a configuration manager provides security while setting configuration information are described in commonly-owned, co-pending U.S. patent application Ser. No. 09/843,901, filed Apr. 27, 2001, and entitled "System and Method for Over the Air Configuration Security", which is incorporated herein by reference in its entirety.

Referring to FIG. 4, a step is illustrated for conditionally installing the new software using security features (step 403) of the configuration manager 303. The step includes corresponding acts 404 and 405, which have been previously described, in addition to corresponding act 408. In particular, the configuration manager 303 queries the CSPs as to whether they would be able to execute their corresponding installation instructions. In response, the CSPs check to determine whether each installation instruction is authorized (act 408). The CSPs may accomplish this using a role mask assigned to the installation file. The role mask may have been passed to the various CSPs along with the query.

The role masks are assigned and used as is now described. When an installation file is originally created, the installation file may be signed or unsigned. Signing of an installation file may be accomplished by including a certificate in the installation file using software such as, for example, Microsoft® Authenticode®. The mobile computing device 102 then matches that certificate to a corresponding role mask. Each role mask may correspond to an appropriate certificate. The mobile computing device 102 then assigns that role mask to the corresponding installation file. If the installation file was unsigned, or had a certificate that did not match a role mask, then a default role mask is assigned that corresponds to appropriate security privileges for an unauthenticated source of an installation file. In some cases, this may mean no security privileges at all.

If any of the installation instructions are not authorized given the role mask, then the configuration manager 303 may refrain from installation as described above. In this manner, the mobile computing device 102 may protect itself from a rogue or negligent provider of new software from performing installation operations that are harmful to the mobile computing device 102 as a whole.

An example of XML-based installation instructions 501 is now described. The following XML illustrates the highest-level nested tags in an example XML document as follows:

```
 1.   <?xml version="1.0" encoding="UTF-8"?>
 2.   <wap-provisioningdoc>
3–47       [Content]
 48   </wap-provisioningdoc>
```

The numbers to the left of each line in the XML code indicate the sequential line number in the example XML document. Note that there are 48 lines in the XML document. Only lines 1, 2 and 48 represent the highest-level of nested XML code. Thus, only lines 1, 2 and 48 are expressly listed above. The lower levels of XML code are represented generically by the term "[Content]", which corresponds to line 3 through line 47 of the XML documents in this case. Whereever the term "[Content]" is specified, this indicates that the exact content for the corresponding lines in the XML document are to be described further below.

As is well known to those of ordinary skill in the art of XML document authoring, line 1 represents the XML version of the XML document as well as the text encoding format of the XML document. Here, line 1 indicates that the XML version is version 1.0, and that the text is encoded using UTF-8 text encoding format.

Line 2 and line 48 are start and closing tags, respectively, indicating that the material between (i.e., lines 3–47 identified as "[Content]") is a wap-provisioning document. The configuration manager 303 recognizes the wap-provisioning document as being a document type that includes configuration instructions. In the case of software installation, however, the wap-provisioning document may also contain file instructions.

The following represents an element within the wap-provisioning document corresponding to line 3 through line 7 of the XML document:

```
3  <characteristic type="Registry">
4      <characteristic type="maindir\subdir\config\app">
5          <para name="Filename" value="newgame"/>
6      </characteristic>
7  </characteristic>
```

Taken together, this element identifies an operation to occur on a "Registry" (see line 3) thus indicating that the element represents a configuration instruction. The configuration location is within a directory structure defined by "maindir\subdir\config\app" (see line 4). The configuration setting is the "Filename" configuration setting which is to receive the value "newgame" (see line 5). Note that the meaning of the value "newgame" may be determined by its context within the XML document.

However, not only does the XML wap-provisioning document contain configuration setting instructions, but also contains actual file operation instructions. The following XML document defines regions of the code that is a file operation element of the XML document:

```
  8    <characteristic type="FileOperation">
9–46       [Content]
 47    </characteristic>
```

Line 8 and line 47 are start and closing tags indicating that the content from line 9 through line 46 represents file operations. The following XML code represents an element forms part of this content:

```
 9    <!--current directory is:\Program Files\My Test App\Temp>
10    <characteristic type="%CE1%\My Test App\Temp>
11        <!--create this directory -->
12        <characteristic type="MakeDir">
13        </characteristic>
14        <!--extract hpopen.txt from CAB 00hpopen.001-->
15        <characteristic type="hpopen.txt">
16        <parm name="Source" value="00hpopen001"/>
17        <parm name="NoOverwriteIfNewer"/>
18            <parm name="Shared"/>
19        </characteristic>
20        <!--extract AirSync.txt from CAB 00hpopen.002-->
21        <characteristic type="AirSync.txt">
22        <parm name="Source" value="00hpopen002"/>
23        <parm name="NoOverwrite"/>
24        </characteristic>
25        </characteristic>
```

Line 9 is comment code that is not executed. Line 9 indicates that file operations are to occur in the directory "Program Files\My Test App\Temp". Line 10 is an opening tag corresponding to the closing tag at line 25 indicating that the content from line 11 through line 24 applies to that directory.

As the comment line 11 indicates, line 12 and line 13 are opening and closing tags, respectively, that create the directory "Program Files\My Test App\Temp". Note that the text "% CE1%" is an encoded form of the text "Program Files". As the comment line 14 indicates, line 15 through line 19 extract a file called "hpopen.txt" from a compressed version of one of the files to be installed 503 called "CAB 00hpopen.001". As the comment line 20 indicates, line 21 through line 24 extract a file called "AirSync.txt" from a compressed version of one of the files to be installed 503 called "CAB 00hpopen.002". The destination for each of these extracted files is the directory "Program Files\My Test App\Temp".

The following XML element indicates a file copy operation:

```
26    <!--copy email.bmp to Temp directory>
27    <characteristic type="\Temp\email.bmp">
28        <characteristic type="Copy"/>
29    <parm name="Source" value="My Test App\email.bmp"/>
30        <parm name="NoOverwriteIfNewer"/>
31        <!--If email.bmp is newer, do not overwrite.-->
32        </characteristic>
33    </characteristic>
```

This element copies a file called "email.bmp" from the temporary directory "Program Files\My Test App\Temp" to the destination directory "Program Files\My Test App".

The following XML element indicates a file move operation:

```
34        <!--move existing file to target file:profile_move.bmp-->
35        <characteristic type="\Temp\profile_move.bmp">
36            <characteristic type="Move">
37    <parm name="Source" value="My Test App\profile.bmp"/>
38            </characteristic>
39        </characteristic>
```

This element moves a file called "profile_move.bmp" from the temporary directory "Program Files\My Test App\Temp" to the destination directory "Program Files\My Test App" to a new file name "profile.bmp".

The following XML element indicates a file delete operation:

```
40    <!--delete target file-->
41    <characteristic type="\Temp\email.bmp">
42        <characteristic type="Delete"/>
43        <parm name="ForceDelete"/>
44        </characteristic>
45    </characteristic>
```

This element deletes the "email.bmp" file from the temporary directory "Program Files\My Test App\Temp".

Note that the installation is accomplished by leveraging existing components of the mobile computing device. The configuration manager 303 need only recognize and parse the file operation elements and then pass the instructions to the appropriate configuration service provider whether it be the file CSP 308 or the registry CSP 309. Accordingly, the incremental processing overhead required to install new software is minimal as compared to just provisioning configuration settings. Accordingly, the principles of the present invention allow for the efficient installation of new software on a mobile computing device, while allowing for rollback and security during the installation process.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. In a network environment that includes a source of a set of computer-executable instructions, and a plurality of mobile computing devices, a method for at least one of the mobile computing devices installing the set of computer-executable instructions using the security features of a configuration manager residing on the mobile computing device, wherein the configuration manager is configured for changing and managing configuration settings of the mobile computing device, the method comprising the following:

an act of the mobile computing device accessing at least a version of at least one file that is to be installed on the mobile computing device;

an act of the mobile computing device accessing computer-executable installation instructions that define how the at least one file is to be installed on the mobile computing device, wherein the installation instructions are structured according to a schema associated with the configuration manager so as to be directly interpretable by the configuration manager associated with the mobile computing device, and such that the configuration manager is enabled to parse both configuration setting instructions as well as file operation instructions included in the installation instructions;

an act of the configuration manager causing the computer-executable instructions to be executed, by at least one of either executing the installation instructions or parsing the installation instructions and sending the parsed installation instructions to one or more configuration service providers; and for at least one of the computer-executable instructions, an act of the configuration manager determining whether or not the execution of the computer-executable instructions is authorized.

2. A method in accordance with claim 1, wherein the act of the mobile computing device accessing at least a version of at least one file that is to be installed on the mobile computing device comprises the following:
an act of the mobile computing device accessing a compressed version of the at least one file that is to be installed on the mobile computing device; and
an act of the mobile computing device decompressing the compressed version of the at least one file that is to be installed on the mobile computing device.

3. A method in accordance with claim 1, wherein the act of the mobile computing device accessing at least a version of at least one file that is to be installed on the mobile computing device comprises the following:
an act of the mobile computing device accessing an uncompressed version of the at least one file that is to be installed on the mobile computing device.

4. A method in accordance with claim 1, wherein the act of the mobile computing device accessing computer-executable installation instructions that define how the at least one file is to be installed on the mobile computing device comprises the following:
an act of the mobile computing device accessing installation instructions that are structured in accordance with an eXtensible Markup Language (XML) specification.

5. A method in accordance with claim 1, wherein the act of the mobile computing device accessing computer-executable installation instructions that define how the at least one file is to be installed on the mobile computing device comprises the following:
an act of the mobile computing device accessing at least one installation instruction to extract a compressed version of a file.

6. A method in accordance with claim 1, wherein the act of the mobile computing device accessing computer-executable installation instructions that define how the at least one file is to be installed on the mobile computing device comprises the following:
an act of the mobile computing device accessing at least one installation instruction to move a file from a source directory location to a destination directory location.

7. A method in accordance with claim 1, wherein the act of the mobile computing device accessing computer-executable installation instructions that define how the at least one file is to be installed on the mobile computing device comprises the following:
an act of the mobile computing device accessing at least one installation instruction to copy a file from a source directory location to a destination directory location.

8. A method in accordance with claim 1, wherein the act of the mobile computing device accessing computer-executable installation instructions that define how the at least one file is to be installed on the mobile computing device comprises the following:
an act of the mobile computing device accessing at least one installation instruction to delete a file.

9. A method in accordance with claim 1, wherein the act of the mobile computing device accessing computer-executable installation instructions that define how the at least one file is to be installed on the mobile computing device comprises the following:
an act of the mobile computing device accessing at least one installation instruction to alter a configuration setting.

10. A method in accordance with claim 1, wherein the act of the configuration manager causing the installation instructions to be executed comprises the following:
an act of the configuration manager directly executing the installation instructions.

11. A method in accordance with claim 1, wherein the act of the configuration manager causing the installation instructions to be executed comprises the following:
an act of the configuration manager causing at least one other module to execute the installation instructions.

12. A method in accordance with claim 11, wherein the act of the configuration manager causing the at least one other module to execute the installation instructions comprises the following:
an act of the configuration manager passing file commands to a file configuration service provider.

13. A method in accordance with claim 11, wherein the act of the configuration manager causing the at least one other module to execute the installation instructions comprises the following:
an act of the configuration manager passing configuration commands to a registry configuration service provider.

14. A method in accordance with claim 1, wherein the act of the configuration manager determining whether or not the execution of the installation instructions is authorized comprises the following:
an act of the configuration manager accessing a role mask corresponding to the set of computer-executable instructions; and
an act of determining whether or not the execution of the installation instructions is authorized using the role mask.

15. A method in accordance with claim 1, wherein the act of the configuration manager determining whether or not the execution of the installation instructions is authorized comprises the following:
an act of the configuration manager determining that at least one of the installation instructions is unauthorized.

16. A method in accordance with claim 15, further comprising the following:
an act of halting or abstaining from the act of the configuration manager causing the installation instructions to be executed after the act of the configuration manager determining that at least one of the computer-executable instructions is unauthorized.

17. A computer program product for use in a network environment that includes a source of a set of computer-executable instructions, and a plurality of mobile computing devices, the computer program product for implementing a method for at least one of the mobile computing devices installing the set of computer-executable instructions using the security features of a configuration manager residing on the mobile computing device wherein the configuration manager is configured for changing and managing configuration settings of the mobile computing device, the computer program product comprising at least one computer-readable media having stored thereon the following:
computer-executable instructions for accessing at least a version of at least one file that is to be installed on the mobile computing device;
computer-executable instructions for accessing computer-executable installation instructions that define how the at least one file is to be installed on the mobile computing device, wherein the installation instructions are structured according to a schema associated with the configuration manager so as to be directly interpretable by the configuration manager associated with the mobile computing device, and such that the configuration manager is enabled to parse both configuration setting instructions as well as file operation instructions included in the installation instructions;

computer-executable instructions for causing the installation instructions to be executed, by at least one of either executing the installation instructions or parsing the installation instructions and sending the parsed installation instructions to one or more configuration service providers; and computer-executable instructions for determining whether or not the execution of the installation instructions is authorized for at least one of the installation instructions.

18. A computer program product in accordance with claim 17, wherein the at least one computer-readable media are physical storage media.

19. A computer program product in accordance with claim 17, wherein computer-executable instructions for determining whether or not the execution of the installation instructions is authorized comprise the following:

computer-executable instructions for accessing a role mask corresponding to the set of computer-executable instructions; and computer-executable instructions for determining whether or not the execution of the instructions is authorized using the role mask.

20. A computer-program product in accordance with claim 17, wherein the computer-executable instructions for determining whether or not the execution of the installation computer-executable instructions is authorized comprise the following:

computer-executable instructions for determining that at least one of the computer-executable instructions is unauthorized.

21. A computer program product in accordance with claim 20, where the at least one computer-readable media further have stored thereon the following:

computer-executable instructions for halting the act of the configuration manager causing the computer-executable instructions to be executed after the act of the configuration manager determining that at least one of the computer-executable instructions is unauthorized.

22. A system for use in a network environment that includes a source of a set of computer-executable instructions, and a plurality of mobile computing devices, the system for installing the set of computer-executable instructions on a mobile computing device using the security features of a configuration manager residing on the mobile computing device wherein the configuration manager is configured for changing and managing configuration settings of the mobile computing device, the system comprising the following:

an installation module configured to parse the set of computer-executable instructions into one or more files to be installed and into installation instructions;

a configuration manager configured to receive the installation instructions from the installation module, wherein the installation instructions are structured according to a schema associated with the configuration manager so as to be directly interpretable by the configuration manager, and such that the configuration manager is enabled to parse both configuration setting instructions as well as file operation instructions included in the installation instructions;

a file configuration service provider configured to receive any of the installation instructions that represent file or directory operations from the configuration manager, and configured to execute the received installation instructions, by at least one of either executing the installation instructions at the configuration manager or parsing the installation instructions and sending the parsed installation instructions to one or more configuration service providers; and a registry configuration service provider configured to receive any of the installation instructions that represent configuration setting operations from the configuration manager, and configured to execute the received installation instructions.

* * * * *